United States Patent Office 3,563,724
Patented Feb. 16, 1971

3,563,724
ILLITE COATED PRILL
Joseph F. Wilson, Bartlesville, Okla., assignor to Phillips Petroleum Company, a corporation of Delaware
No Drawing. Filed June 17, 1966, Ser. No. 558,258
Int. Cl. C05c 1/02
U.S. Cl. 71—59       5 Claims

ABSTRACT OF THE DISCLOSURE

Illitic Tennessee clay found in deposits near Paris, Tenn., has been found by itself to reduce the crushing strength of ammonium nitrate prills to about 5–10 pounds per square inch (friable bagset). The addition of an organic material, as described, gives a completely free flowing prill, even after a severe test. The illite described is the first applicable with good results without additives such as organic material, e.g., an alkali sulfonate. Properties of the Paris, Tenn., deposit illite are given together with test results. A heating step which even further improves the anticaking properties which the clay can impart to the prills is also described.

This invention relates to a coated prill. In one concept of the invention, it relates to coating of a prill with illitic Tennessee clay found in deposits near Paris, Tenn. In another of its concepts, the invention relates to a prilled material such as ammonium nitrate coated with illitic Tennessee clay as found in said deposits. In another of its concepts, the invention relates to a method of clay coating a prill, such as an ammonium nitrate prill, by pulverizing and drying an illitic Tennessee clay, as described herein, and then applying said dried clay to the prill. In a still further concept of the invention, it relates to the coating of a crystalline compound or prill subject to caking on storage with a layer of illitic Tennessee clay which is found in deposits near Paris, Tenn.

There has existed in the art and still exists in the art, a problem of caking or sticking together of particles of certain materials. For example, ammonium nitrate prills which are not specifically treated to avoid caking of the same tend to cake upon storage. Such products are difficult to handle and to distribute.

In earlier work, it has been found that certain clays such as kaolin, attapulgite and certain alumina silicates, tend to combat the caking tendency of subdivided materials such as ammonium nitrate when these clays are coated thereupon. Further, it has been found that such clays, when combined with alkali sulfonates, are quite effective in preventing caking, as here discussed.

The invention can be used to coat any kind of subdivided, particle form material, such as a prill. However, those containing significant quantities of ammonium nitrate, urea and potassium hydrogen phosphate are particularly subject to caking. Specific compositions are identified as N-P-K fertilizer, 10–20–10 mix, 20–20–20 mix.

Herein and in the claims the terms "prill" and "particle" are considered to be equivalents.

Patents related to the field here involved are 3,070,435, issued Dec. 25, 1962, Robert E. Reusser and Van C. Vives; 3,116,185, issued Dec. 31, 1963, Joseph F. Wilson, Van C. Vives and John C. Hillyer; and 3,190,774, issued June 22, 1965, Joseph F. Wilson.

I have now found, surprisingly, that the illite clay with which the invention deals and which comes from the lower section of the Paris, Tenn., deposit, will, by itself, reduce the crushing strength of ammonium nitrate prills to about 5–10 p.s.i. (friable bagset). Further, I have found that the addition of an organic material as described in the second and third above-identified material, will give a completely free-flowing prill, even after a severe test.

It is an object of this invention to provide a coated prill. It is another object of this invention to provide a method for coating a prill. It is a further object of this invention to provide a free-flowing coated prill, for example a free-flowing prilled ammonium nitrate. A still further object of the invention is to provide a coating upon a prill such as a prill of ammonium nitrate that a mass of such prills will have a crushing strength of the order of not more than about 5–10 p.s.i. It is a still further object of the invention to substitute in the now available clay coated prill, in which the coating may or may not contain organic material, a different clay which yields surprisingly considerably better results than obtainable with earlier clays used in the art. More particularly, it is an important object of this invention to provide a coating of a newly applied clay which by itself considerably improves the non-caking characteristics of a coated prill.

Other concepts, objects, and the several advantages of this invention are apparent from a study of this disclosure and the appended claims.

According to the present invention, there is provided a coated prill and a method for producing the same which comprises a prill coated with Tennessee illite taken from the lower section of the Paris, Tenn., deposit.

The illite of the invention is considered to be the first found to be applicable with good results without additives such as an organic material, for example, an alkali sulfonate as found set forth and described in the second and third above-mentioned patents.

The chemical and DTA analyses show the clay of the invention to be an illitic clay. Its calcium content appears to be too low, and its potassium content appears to be too high for it to be termed a montmorillonite clay.

It is difficult to characterize clay materials belonging to the same group. In order to compare and to differentiate illitic McCracken clay and the illitic Paris, Tenn., clay of the invention, X-ray fluorescence analyses were made and other samples were subjected to differential thermal analysis. The results are summarized below:

TABLE I.—X-RAY FLUORESENCE ANALYSIS

| Element | McCracken clay | Tennessee clay (grey) |
|---|---|---|
| Weight percent: | | |
| K | 3.0 | 1.1 |
| Ca | 0.4 | 0.48 |
| Ti | 0.2 | 0.16 |
| Fe | 2.0 | 2.0 |

The illitic Paris, Tenn., clay will have a composition in the ranges as follow:

wt. percent K—at least 1 but less than 2
wt. percent Ca—at least .4 but less than 0.5
wt. percent Ti—at least 0.1 but less than 0.18.

Differential thermal analysis is the most widely used modern technique for the identification of clay minerals. A thermal analysis is a graphic recording of the changes which occur in a clay mineral as a function of temperature. Such changes are manifested by either a cooling or a heat releasing effect. The intensity of the endothermic and exothermic actions and the temperature range at which they occur is affected by the chemical composition of the material; hence, each clay mineral may be recognized by its distinctive thermal pattern. Essentially, the method involves heating the material at a constant rate to some arbitrary temperature and recording with suitable instruments the deviation in temperature between the sample and a neutral material, generally calcined alumina heated in the same manner. Usually, a maximum temperature of 1000° C. is sufficient to include those reactions which establish mineral identity; although, in some cases, the heating is carried to a higher point. A determination can be obtained in 2–3 hours.

TABLE II.—DTA INTERPRETATION

| Temperature profile, °C.: | McCracken clay | Tennessee clay |
|---|---|---|
| 105 | Absent | Endotherm. |
| 120 | Endotherm | Absent. |
| 205 | Absent | Endotherm. |
| 305 | do | Exotherm shoulder. |
| 960 | Slight endotherm | Large endotherm. |
| 1,020 | Small exotherm | Large exotherm. |

The elementary analysis shows differences between the two samples. The DTA diagram interpretation indicates that the two samples behave very differently when subjected to a heat treatment. The McCracken clay undergoes several changes, some relatively large, which the Tennessee clay does not undergo.

Tests were made to determine the effectiveness of the Tennessee clay as a coating composition, with and without alkali sulfonate treatment. Other clays were also tested for comparison. The procedure was the same as that described in the earlier work, now Pat. No. 3,223,478, issued Dec. 14, 1965, Joseph F. Wilson.

The clay was pulverized to pass 100 percent through 325 mesh screen and dried at 105° C. before being applied to ammonium nitrate prills. In another series of tests, the Tennessee clay was heated to 600° C. for 3–4 hours to test its effectiveness after heat treatment. The test results are shown in Table III.

air pressure to the ammonium nitrate particles in the cylinders. The entire arrangement was then placed in a oven which was fitted with both heating and cooling means. The samples were then heated from 50 to 140° F. and maintained 13 hours, after which the samples were cooled to 50° F. over a 3 hour period. The full cycle of from 50 to 140° F. and back to 50° F. required 6 hours and this cycle was carried out three times, requiring a total time of 18 hours for three full cycles. The samples were then removed from the oven and let stand until they reached room temperature. The ammonium nitrate cakes which had formed were then removed from the cylinders, and the cakes were tested to breaking or crushing in a Carver commercial press. The total pounds required to break each cake was recorded, and since the corresponding sectional area of each cake was 2.75 square inches, the breaking pressure in p.s.i. was calculated and recorded. Where this procedure resulted in ammonium nitrate samples which did not cake but rather were free-flowing, these samples were designated "FF." And where the procedure resulted in ammonium nitrate cakes which collapsed upon subjection to initial pressure (i.e., less than 10 p.s.i.) in the Carver press before a pressure reading could be noted, such samples were designated as "LB" to denote light bridging and collapse of the cakes to free-flowing prills.

It will be understood by one skilled in the art in possession of this disclosure having studied the same, that I have identified a surprisingly outstanding clay for use in coating prills to render these substantially free flowing. The temperature at which the clay is dried can be varied.

TABLE III

| Base | Percent wt. Petro-Ag[1] on clay (Na sulfonate) | Percent mix on AN prills | Percent water | Crushing pressure (p.s.i.) |
|---|---|---|---|---|
| Run No.: | | | | |
| 1 | Tennessee clay, dry | 0 | 3.0 | 0.20 | Bagset (friable). |
| 2 | do | 0 | 3.0 | 0.21 | Do. |
| 3 | Barnet clay (kaolin) | 0 | 3.0 | 0.16 | 150. |
| 4 | Diatomaceous earth | 0 | 3.0 | 0.25 | 150. |
| 5 | Tennessee clay, dry | 2 | 3.0 | 0.19 | Free flow. |
| 6 | do | 8 | 0.9 | 0.13 | 160. |
| 7 | Tennessee (treated 600° C.) | 0 | 3.0 | 0.19 | 75. |
| 8 | do | 2 | 3.0 | 0.19 | Bagset.[2] |
| 9 | do | 2 | 3.0 | 0.18 | 50. |
| 10 | do | 8 | 0.7 | 0.14 | 150.[2] |

[1] Sodium salt of methylnaphthalene sulfonic acid.
[2] Coating had a tendency to flake off during tests.

The results show that the Tennessee illite clay is an effective coating agent for ammonium nitrate prills even without the sodium sulfonate treatment (Runs 1 and 2) dried at 105° C. Its performance is improved by the addition of 2 weight percent of sulfonate based on weight of clay (Run 5).

The heat treatment (600° C.) yielded a product with a crushing strength of 75 p.s.i., see Run 7. This is still far superior to the controls, see Runs 3 and 4, albeit perhaps not as good as the merely dried Tennessee illite. With sulfonate, the heat treated clay was also effective (Run 8). An increase in sulfonate treatment and reduction of the amount of mixture deposited on the prills to less than one percent proved ineffective (Runs 6 and 10) for both the dried and the heat treated clay.

The tendency of the ammonium nitrate samples to cake on standing was evaluated by a "cake test," a procedure which is a modification of that described in Ind. and Eng. Chem., 33, 121–127 (1941). In the "cake test," 65 gram portions of the ammonium nitrate was poured into polyethylene cylinders fabricated of two layers of 1.5 mil wall thickness polyethylene. The inside diameter of the cylinders was 1⅞ inches, and the ends of the cylinders were blocked with Lucite blocks ½ inch thick and 1⅛ inches in diameter. The blocks were held in the cylinders by means of cellophane tape. The loaded cylinders were then placed in a brass mold containing three holes, each 4 inches deep, 2 inches in diameter. A bellows was then attached to the top of the mold so as to supply 24 p.s.i.

Also, the temperature at which the clay is heat treated can be varied. The temperatures given herein are by way of preferred embodiments only, and currently the lower temperature is preferred, especially when no organic material which functions the way the sulfonate does is to be used. Generally speaking, the drying need be conducted only at a temperature at which the clay will ultimately dry. At atmospheric pressure, 105° C. seems to be quite adequate. However, somewhat lower temperatures, for example as low as 75° C., can be used, especially if time is not of essence, and/or if a reduced pressure is readily and economically available. Such conditioning of the clay will retain its excellent properties here considered. It does not now appear that the heat treatment needs to be conducted at much above 600° C., although temperatures as high as say 700° C. will not materially alter the properties of the clay, especially when used with an organic material functioning as does the sulfonate.

Ordinarily, sufficient clay is used to cover the prill or at least to prevent the agglomerative process which leads to caking.

Where storage is to be conducted over a long period of time, more clay will be used than otherwise. Further, approximately 1–5 weight percent of the clay is applied based on the weight of the prill when the prills are of a size to pass through 8 mesh screen. Currently, an amount of clay in the range 2–5 weight percent of the prills, in the case of ammonium nitrate especially, is preferred.

When drying or heating the clay, a sufficient time will be allowed, as one skilled in the art will understand. When drying at the lower temperatures, considerable time may be required and the amount of weight loss over that which can be experienced upon very extensive drying will serve as a guide. When heat treated at the higher temperatures of say 550–650° F., the time for the heat treatment will usually lie in the range of from about .5 to about 4 to 5 hours, preferably the range for this heating will be 2–4 hours.

The testing procedure above described is a severe one. The cycling test described as applied herein shows that the newly discovered clay is most highly effective since the test is an extremely severe one. Thus, to obtain a free flowing prill or even to obtain a crushing strength as low as about 5–10 p.s.i. (friable bagset) is very good indeed.

Representative alkylaryl sulfonates useful in the practice of this invention include the sodium salt of 2-n-butylbenzenesulfonic acid; the sodium salt of 3-tert-dodecylbenzenesulfonic acid; the potassium salt of 4-n-eicosylbenzenesulfonic acid; the potassium salt of 4-n-tetradecylbenzenesulfonic acid; the lithium salt of 4-tetracosylbenzenesulfonic acid; the disodium salt of 6-n-decylbenzene-p-disulfonic acid; the disodium salt of dimethyl naphthalene-1,2-disulfonic acid; the trirubidium salt of 5-tert-hexadecylbenzene-2,4,6-trisulfonic acid; the sodium salts of methylnaphthalenesulfonic acid, such as the sodium salts of 1-methylnaphthalene-2-sulfonic acid, 1-methylnaphthalene-4-sulfonic acid, and mixtures thereof; the sodium salt of 6-n-eicosylnaphthalene-1-sulfonic acid; the trisodium salt of 6,7,8-triethylnaphthalene-1,2,3-trisulfonic acid; the dicesium salt of 2,5-dimethylbenzene-1,3-disulfonic acid; the disodium salt of 4,6-di-n-decylnaphthalene 1,8-disulfonic acid; the potassium salt of 7-tert-dodecylnaphthalene-2-sulfonic acid; the sodium salt of 2,5-dimethylbenzenesulfonic acid; and the like, including mixtures thereof. Of these respective sulfonates, the sodium salts of methylnaphthalenesulfonic acid in dimethylnaphthalenesulfonic acid are preferred, such materials being commercially available, for example under the name Petro Ag.

By the use of the term "prill" herein is meant any subdivided form of any material which tends to cake on storage or otherwise to agglomerate and which it is desired to keep either free-flowing or to render readily friable if it has caked or set as in a bag.

The invention is particularly useful in the fertilizer field, and as described is especially useful to prevent caking of fertilizers such as those containing ammonium nitrate, urea and/or phosphate such as potassium hydrogen phosphate, etc.

Reasonable variation and modification are possible within the scope of the foregoing disclosure and the appended claims to the invention, the essence of which is that Paris, Tenn., illite or illitic clay has been found to possess surprisingly very unusual and extremely good properties for rendering a prill such as an ammonium nitrate prill substantially resistant to caking.

I claim:

1. A particle form material which tends to cake together with other similar particles upon standing, the particle having been coated with a coating consisting essentially of an illitic clay having a composition in the ranges as follow:

wt. percent K—at least 1 but less than 2
wt. percent Ca—at least .4 but less than 0.5
wt. percent Ti—at least 0.1 but less than 0.18 and having a DTA profile: endotherm at 105° C., 205° C., exotherm shoulder at 305° C., and large endotherms at 960 and 1020° C.

2. A prill coated with a coating consisting essentially of a Paris, Tennessee, illite having the physical and chemical characteristics of claim 1.

3. A prill according to claim 2 wherein the material coated contains ammonium nitrate.

4. A prill according to claim 3 wherein an alkali metal salt of an alkylaryl sulfonic acid is within said coating.

5. A prill according to claim 1 wherein X-ray fluorescence analysis of the clay is substantially as follows on weight percent: K, 1.1; Ca, 0.48; Ti, 0.16; Fe, 2.0; and the clay has a grey color.

References Cited

UNITED STATES PATENTS

| | | | |
|---|---|---|---|
| 2,739,036 | 3/1956 | Kamenjar et al. | 71—64E |
| 3,116,185 | 12/1963 | Wilson et al. | 23—103 |
| 3,125,434 | 3/1964 | Smith et al. | 71—64E |
| 3,250,607 | 5/1966 | Sawyer et al. | 71—64E |

REUBEN FRIEDMAN, Primary Examiner

B. H. LEVENSON, Assistant Examiner

U.S. Cl. X.R.

71—28, 64; 23—103; 260—555